(12) United States Patent
Carey et al.

(10) Patent No.: US 7,354,005 B2
(45) Date of Patent: Apr. 8, 2008

(54) VARIABLE CAPACITY CLIMATE CONTROL SYSTEM FOR MULTI-ZONE SPACE

(75) Inventors: Steven L. Carey, St. Louis, MO (US); Jeff Edgar, St. Louis, MO (US); Thomas J. Fredricks, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 656 days.

(21) Appl. No.: 11/063,818

(22) Filed: Feb. 23, 2005

(65) Prior Publication Data
US 2006/0186213 A1    Aug. 24, 2006

(51) Int. Cl.
*F24F 7/00* (2006.01)
*G01K 13/00* (2006.01)
*F25D 17/04* (2006.01)
*G01M 1/38* (2006.01)
*G08B 17/00* (2006.01)

(52) U.S. Cl. .................. 236/46 R; 62/129; 62/205; 700/277; 340/584

(58) Field of Classification Search ............... 236/1 B, 236/46 R, 51; 62/129, 186, 205; 340/584; 374/166, 167; 700/276, 277
See application file for complete search history.

(56) References Cited

U.S. PATENT DOCUMENTS 4,058,253 A * 11/1977 Munk et al. ............. 236/46 R
6,364,211 B1    4/2002 Saleh
6,488,081 B2    12/2002 Rayburn et al.
6,513,723 B1    2/2003 Mueller et al.

* cited by examiner

*Primary Examiner*—Chen-Wen Jiang
(74) *Attorney, Agent, or Firm*—Harness, Dickey & Pierce, P.L.C.

(57) ABSTRACT

A climate control system having two or more stages of cooling operation or heating operation is provided for supplying conditioned air to a plurality of zones within a space, where the climate control system comprises a plurality of controllable zone dampers for controlling the supply of conditioned air to each of the plurality of zones, and a plurality of zone temperature sensors for periodically sensing temperature at preset intervals and transmitting sensed temperature information when the temperature of the zone has changed by more than a predetermined amount. The climate control system further comprises a thermostat that is adapted to initiate operation of the circulating air blower and the cooling system at less than full capacity when at least one zone temperature sensor transmits a sensed temperature that differs from the set point temperature by more than a specific amount, wherein the thermostat switches the circulating air blower and cooling system to full capacity operation when either the cooling system has operated at less than full capacity for more than a predetermined time or when more than a predetermined number of zone temperature sensors transmit sensed temperatures that differ from the set point temperature by more than a specific amount.

22 Claims, 1 Drawing Sheet

VARIABLE CAPACITY CLIMATE CONTROL SYSTEM FOR MULTI-ZONE SPACE

FIELD OF THE INVENTION

This invention relates generally to a system and method for controlling a climate control system for a space having a plurality of zones, and more particularly to a variable capacity climate control system having a thermostat for controlling the supply of conditioned air to a plurality of zones.

BACKGROUND OF THE INVENTION

Multi-zone heating and cooling systems are often utilized for supplying conditioned air to the particular zones within a space requiring heating or cooling. These systems are often used to supply conditioned air to a plurality of zones within the space, and include controllable zone dampers for permitting the flow of conditioned air to each zone. However, such systems have often employed a bypass damper to address the problem of high circulating air pressure that results when most of the dampers are closed and only a few zones are being supplied with conditioned air. When only one or two zones require heating, for example, the heating system operates at full capacity to supply conditioned air to the one or two zones, and a bypass damper is opened to alleviate the circulating air pressure and allow supply air to flow to the return air duct. Variable capacity heating and cooling systems have also been employed to supply conditioned air at a level that will meet the heating or cooling load for a space. Even where variable capacity heating and cooling systems have been utilized in multi-zone spaces, a bypass damper is still typically employed to alleviate circulating air pressure. Such systems do not provide an appropriate minimum level of system operation to supply conditioned air to only a few zones that require heating or cooling.

SUMMARY OF THE INVENTION

The present invention relates to the control of a climate control system having two or more stages of cooling operation or heating operation for providing conditioned air to a plurality of zones within a space. In some embodiments, a climate control system having two or more cooling stages for supplying conditioned air to a plurality of zones is provided, the climate control system comprising a plurality of controllable zone dampers for controlling the supply of conditioned air to each of the plurality of zones, and a plurality of zone temperature sensors for periodically sensing temperature at preset intervals and transmitting sensed temperature information when the temperature of the zone has changed by more than a predetermined amount. The climate control system further comprises a thermostat that is adapted to initiate operation of the circulating air blower and the cooling system at less than full capacity when at least one zone temperature sensor transmits a sensed temperature that differs from the set point temperature by more than a specific amount, wherein the thermostat switches the circulating air blower and cooling system to full capacity operation when either the cooling system has operated at less than full capacity for more than a predetermined time or when more than a predetermined number of zone temperature sensors transmit sensed temperatures that differ from the set point temperature by more than a specific amount. The climate control system may further comprise a heating system having two or more stages of operation, wherein the thermostat is adapted to initiate operation of the circulating air blower and the heating system at less than full capacity when at least one zone temperature sensor transmits a sensed temperature that differs from the set point temperature by more than a specific amount, and the thermostat switches the circulating air blower and heating system to full capacity operation when more than a predetermined number of zone temperature sensors transmit sensed temperatures that differs from the set point temperature by more than a specific amount.

In accordance with one aspect of the present invention, one embodiment of a climate control system for a plurality of zones is provided that comprises a thermostat that signals a controllable zone damper to switch to an open position when the difference between the set point temperature and a sensed temperature transmitted by a zone temperature sensor corresponding to the controllable zone damper is more than a specific amount, and signals a controllable zone damper to switch to a closed position when the sensed temperature transmitted by the zone temperature sensor corresponding to the controllable zone damper is at the set point temperature or within a specific amount. The thermostat is capable of receiving transmitted temperature signals from a plurality of zone temperature sensors, responsively initiating variable capacity operation of a cooling system and signaling a plurality of zone dampers to control the supply of conditioned air to each zone within the space. The climate control system may further comprise a heating system having two or more stages of operation, wherein the thermostat is adapted to initiate operation of the circulating air blower and the heating system at less than full capacity when at least one zone temperature sensor transmits a sensed temperature that differs from the set point temperature by more than a specific amount, and the thermostat switches the circulating air blower and heating system to full capacity operation when either the heating system has operated at less than full capacity for more than a predetermined time or when more than a predetermined number of zone temperature sensors transmit sensed temperatures that differs from the set point temperature by more than a specific amount.

In accordance with another aspect of the present invention, a second embodiment of a climate control system for a plurality of zones is provided that comprises a thermostat that discontinues the use of transmitted temperature information from at least one zone temperature sensor and displays a system error if the at least one zone temperature sensor does not transmit a significant change in sensed temperature for after a predetermined time period of supplying conditioned air to the zone.

Further aspects of the present invention will become apparent from the detailed description provided hereinafter. It should be understood that the detailed description and specific examples, while indicating various embodiments and methods of the invention, are for illustration purposes only and are not intended to limit the scope of the invention. This prevents unnecessary operation of the climate control system and alerts the user or installer that the zone is not functioning properly. The thermostat accordingly would alert the user or installer of the zone error to allow for correction of the problem.

DETAILED DESCRIPTION OF THE INVENTION

Figure 1:
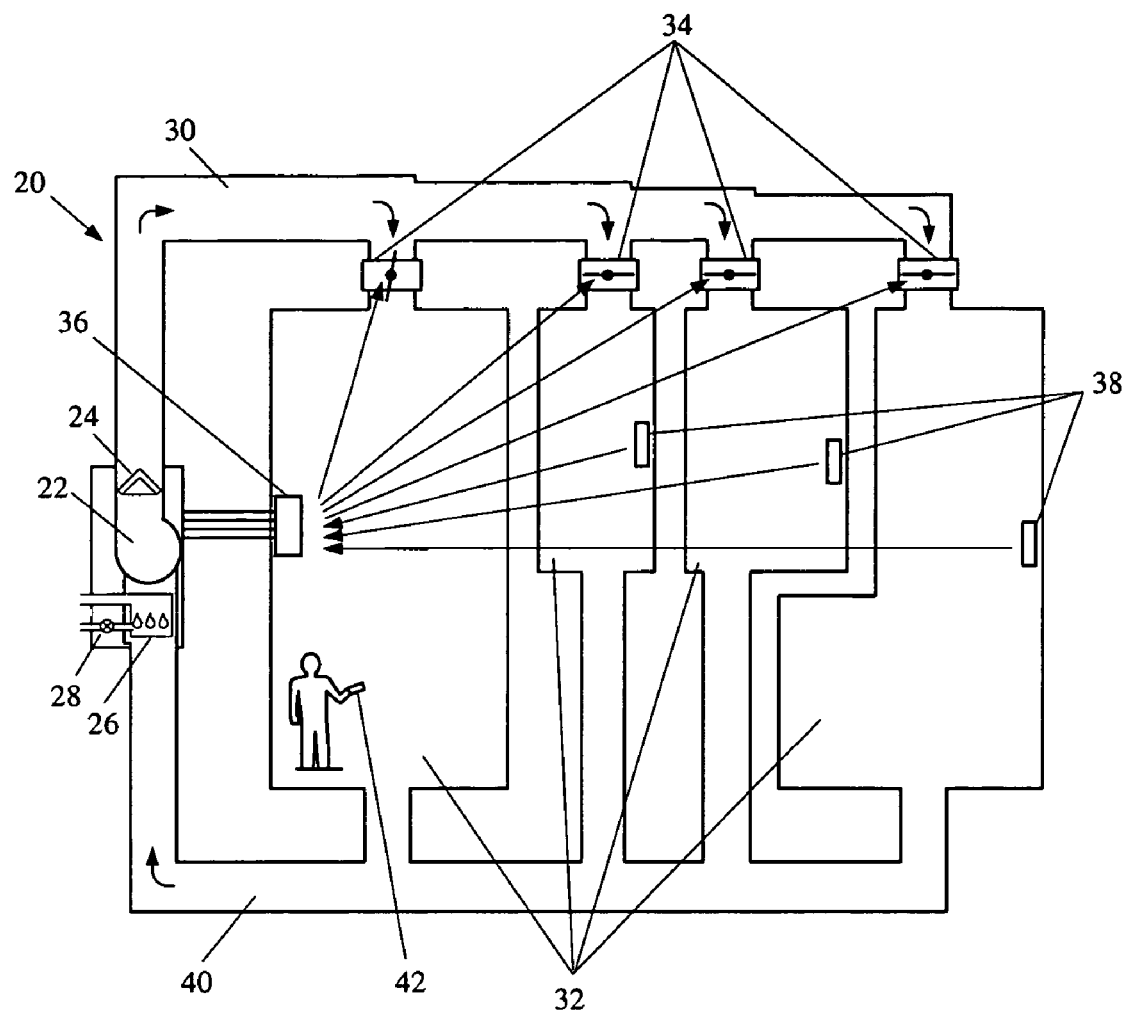
FIG. 1 is an illustration of one embodiment of a climate control system for conditioning multiple zones of a space in accordance with the principles of the present invention.

One embodiment of a multi-stage climate control system for a multi-zone space according to the principles of the present invention is shown generally at 20 in FIG. 1. The climate control system 20 comprises a variable speed circulating air blower 22 and a multi-stage cooling system 24 having at least a full capacity mode and a less than full capacity mode of operation for providing conditioned air to a space. The climate control system 20 may further comprise a multi-stage heating system 26 having at least a full capacity mode and a less than full capacity mode of heating operation for providing conditioned air to a space. Such a heating system, for example, may comprise a multi-stage gas valve for providing at least two levels of gas flow. The flow of conditioned air is supplied to the space through a supply duct 30 to a plurality of zones 32 within the space, where a plurality of controllable zone dampers 34 control the supply of conditioned air into the plurality of zones 32 in the space. The climate control system 20 utilizes a thermostat 36 and a plurality of zone temperature sensors 38 for periodically sensing temperature within the zones 32 at preset intervals and responsively initiating operation of the cooling system 24 at less than full capacity when the sensed temperature in at least one zone 32 differs from the thermostat's set point temperature by more than a predetermined amount. The thermostat 36 transmits a signal requesting the controllable zone damper for the at least one zone to open to provide conditioned air to the zone. A temperature change in any of the other zones 32 may prompt the thermostat to request additional zone dampers 34 to open and the cooling system 24 to operate at full capacity. The thermostat 36 may also request each controllable zone damper 34 for a zone 32 in which the sensed temperature is within a specific amount of the thermostat's set point temperature to close. The thermostat 36 or appropriate zone temperature sensor 38 senses the changing temperature of the one or more zones 32 receiving conditioned air. When the temperature of a zone 32 receiving conditioned air nears the set point temperature, the corresponding controllable zone damper 34 is closed to prevent further flow of conditioned air to the respective zone. As the number of zones receiving conditioned air diminishes, the thermostat 36 correspondingly requests the cooling system to operate at reduced capacity until the remaining zones 32 reach the set point temperature.

In one embodiment, a climate control system 20 having two or more stages of cooling operation is provided for supplying conditioned air to a plurality of zones 32 within a space, the climate control system 20 comprising a plurality of controllable zone dampers 34 for controlling the supply of conditioned air to each of the plurality of zones 32, and a plurality of zone temperature sensors 38 for periodically sensing temperature at preset intervals and transmitting sensed temperature information when the temperature of the zone 32 has changed by more than a predetermined amount. The climate control system 20 further comprises a thermostat 36 that is adapted to initiate operation of the circulating air blower 22 and the cooling system 24 at less than full capacity when at least one zone temperature sensor 38 transmits a sensed temperature that differs from the set point temperature by more than a specific amount, wherein the thermostat 36 switches the circulating air blower 22 and cooling system 24 to full capacity operation when either the cooling system 24 has operated at less than full capacity for more than a predetermined time or when more than a predetermined number of zone temperature sensors 38 transmit sensed temperatures that differ from the set point temperature by more than a specific amount. The climate control system 20 may further comprise a heating system 26 having two or more stages of operation, wherein the thermostat 36 is adapted to initiate operation of the circulating air blower 22 and the heating system 26 at less than full capacity when at least one zone temperature sensor 38 transmits a sensed temperature that differs from the set point temperature by more than a specific amount, and the thermostat 36 switches the circulating air blower 22 and heating system to full capacity operation when either the heating system 26 has operated at less than full capacity for more than a predetermined time or when more than a predetermined number of zone temperature sensors 38 transmit sensed temperatures that differs from the set point temperature by more than a specific amount. In this embodiment, the thermostat 36 initiates cooling system or heating system operation at full capacity when at least three zone temperature sensors 38 transmit sensed temperatures that differ from the set point temperature by more than a specific amount.

The thermostat 36 transmits a signal requesting a controllable zone damper 34 to switch to an open position when the difference between the set point temperature and a sensed temperature transmitted by the zone temperature sensor 38 corresponding to the controllable zone damper 34 is more than a specific amount. The open zone damper 34 then permits the flow of conditioned air to the zone 32 to bring the temperature in the zone to the set point temperature of the thermostat 36. In one embodiment the thermostat 36 preferably transmits request signals to the plurality of zone dampers via wireless Radio Frequency communication, but may alternately communicate via wired connection. The thermostat 36 switches a controllable zone damper 34 to a closed position when the sensed temperature transmitted by the zone temperature sensor 38 corresponding to the controllable zone damper 34 is at the set point temperature or within a specific amount. The closed zone damper 34 prevents further supply of conditioned air into the zone such that the temperature of the particular zone 32 remains at or near the set point temperature.

The thermostat 36 is capable of receiving wireless transmission signals from a plurality of remote temperature sensors 38 that are battery powered and are configured to periodically sense temperature at extended preset intervals. When a remote temperature sensor 38 for a particular zone 32 senses a temperature change of less than a minimum amount that is indicative of conditioned air not being supplied to the zone 32, the zone temperature sensor 38 begins sensing temperature at extended preset intervals to reduce transmission frequency and prolong battery life. When the zone temperature sensor 38 transmits a sensed temperature to the thermostat 36 that differs from the set point temperature by more than a specific amount, the thermostat 36 requests operation of the cooling system 24 or heating system 26 and opens the particular zone damper 34 to initiate the supply of conditioned air to the zone 32. When a zone temperature sensor 38 senses more than a preset temperature change that is indicative of conditioned air being supplied to the zone 32, the zone temperature sensor 38 is configured to begin periodically sensing temperature at shortened preset intervals. This allows the zone temperature sensor 38 to more responsively tract temperature changes and transmit the sensed temperature to the thermostat 36, which can then promptly close the zone damper to provide improved climate control for the plurality of zones in the space. An example of such a thermostat that is capable of receiving transmitted temperature information is a 1F95-479 Thermostat manufactured by White-Rodgers, a Division of Emerson Electric Co. Such a thermostat for receiving and transmitting information is disclosed in a co-assigned patent application entitled "Thermostat Control System Providing Power Saving Transmissions", filed on Nov. 16, 2004, and is incorporated herein by reference.

The thermostat 36 may also be adapted to automatically initiate a configuration mode upon initial installation and power up. The thermostat 36 would then begin configuration by initiating a discovery mode within a network, and would query cooling and heating systems 24 and 26, remote sensors 38 and dampers 34 that are subsequently installed after the thermostat 36. While the thermostat 36 is preferably configured to transmit and receive signals to the other installed components via wireless communication means, the thermostat 36 is also adapted to be wired to a network such as an RS 485 network. As individual cooling and heating systems 24 and 26, remote sensors 38 or dampers 34 are installed and powered up, the installed components communicate information to the thermostat 36 comprising its device type and its assignment code, if one exists. The installed devices are also preferably configured to transmit and receive signals to the thermostat 36 via wireless communication means, but may communicate via a wired network when the device is connected to such a network. The installed zone sensors, zone dampers and components would communicate back to the thermostat 36 at offset times to avoid collisions of transmission to the thermostat 36. Methods for configuring the set up of controllable zone dampers and remote temperature sensors in a multi-zone space are disclosed in co-assigned patent application entitled "System and Method For Controlling A Multi-Zone Heating Or Cooling System", filed on Feb. 22, 2005, and is incorporated herein by reference.

The remote temperature sensors 38 for each zone 32 may further comprise a pair of user input buttons for enabling the user to adjust the temperature in each zone to individual preference. Specifically, the user may press an up or a down button on the remote temperature sensor 38 to raise or lower the temperature in the zone. However, the zone temperature sensor 38 does not transmit or store a user set point temperature, but rather provides for offsetting the sensed temperature value by a user selected amount. The zone temperature sensor 38 offsets the sensed temperature value by the user selected value, and transmits the offset sensed temperature value to the thermostat 36. For example, if the user desires a particular zone 32 currently at 70 degrees to be warmer than the 70 degree set point, the user may press the up button twice on the zone temperature sensor 38 to adjust the temperature by two degrees Fahrenheit. The zone temperature sensor 38 would then subtract two degrees from the sensed temperature on its next transmission. Thus, upon sensing a decrease in temperature of more than a predetermined amount, the zone temperature sensor 38 would transmit a signal indicating a sensed temperature of about 68 degrees Fahrenheit. The thermostat 36 could then initiate operation of the heating system to bring the offset temperature value of 68 degrees up to an offset temperature value of 70 degrees. Thus, the particular zone 32 would then be held at 72 degrees by virtue of the 2 degree offset to the sensed temperature for the zone temperature sensor 38. Likewise, the thermostat would not initiate cooling operation to supply conditioned or cooled air to the zone until the offset temperature value increased to 70 degrees, at which point the actual sensed temperature of the zone would be 72 degrees. Thus, the user may adjust the temperature setting for a particular zone without having to go to the thermostat 36 or enter programming information to the thermostat 36. An example of such a remoter temperature sensor that is capable of transmitting temperature information is a F0148-1328 remote sensor manufactured by White-Rodgers, a Division of Emerson Electric Co. Such a remote sensor for transmitting information is disclosed in a co-assigned U.S. Pat. No. 6,513,723 entitled "Method and Apparatus For Automatically Transmitting Temperature Information", and is incorporated herein by reference.

The zone temperature sensor 38 may further comprise user input means for selecting a temporary unoccupied mode in which the temperature sensor transmits an inactive status to the thermostat for a predetermined time period. In this mode, the zone temperature sensor 38 does not transmit a temperature signal but rather an inactive status that instructs the thermostat 36 to ignore the particular zone temperature for a preset time period. This provides the user will the ability to set-back the temperature for a zone that will not be occupied for a given time to conserve energy usage. The zone temperature sensor 38 may further comprise a user input means for selecting an off mode in which the temperature sensor indefinitely transmits an inactive status to the thermostat until the mode is de-selected by the user this mode, the zone temperature sensor 38 does not transmit a temperature signal but rather an inactive status that instructs the thermostat 36 to indefinitely ignore the particular zone temperature. This provides the user will the ability to disable a zone temperature sensor for a zone or room that is rarely occupied or used, to conserve energy usage.

In a second embodiment of a climate control system, the thermostat 36 may discontinue the use of at least one zone temperature sensor 38 and display a system error if the at least one zone temperature sensor 38 does not transmit a significant change in sensed temperature for the at least one zone after a predetermined period of supplying conditioned air to the zone. Specifically, if the zone temperature sensor 38 transmits a sensed temperature value that differs more than a specific amount, the thermostat 36 requests operation of the cooling system 24 or heating system 26 and opens the controllable zone damper 34 for the particular zone to initiate the supply of conditioned air to the zone. If the zone damper 34 is not operating, is malfunctioning, or the damper vent to the zone is covered by furniture or a rug hindering the supply of conditioned air to the zone, the zone temperature will not be appreciably affected. The zone temperature sensor 38 will not sense any appreciable temperature change even after the climate control system has operated for a considerable time period. The thermostat 36 accordingly will discontinue the use of temperature information from at least one zone temperature sensor 38 and display a system error after a predetermined period of system operation. This prevents unnecessary operation of the climate control system and alerts the user or installer that the zone is not functioning properly. The thermostat 36 accordingly would alert the user or installer of the zone error to allow for correction of the problem.

The climate control system may further comprise a hand held remote control 40 capable of transmitting a user selected desired heating set point temperature, a user-selected desired cooling set point temperature, or a sensed temperature local to the hand held remote. The hand held remote control 40 is capable of sensing and transmitting temperature information in the same manner as the remote temperature sensors 38, and would further comprise user input means for adjusting or offsetting the sensed temperature value. The hand held remote control 40 is capable of transmitting signals to the thermostat 36 to provide information as to which zone the hand-held remote control is in (and the occupant using the remote). This may be achieved by either the user inputting the presently occupied zone, or by the hand held remote 40 sensing zone temperature sensor transmissions in a manner such that the hand-held remote only detects transmissions from a temperature sensor in close proximity or within the same zone. The hand held remote 40 may also comprise user input means for enabling programming of the thermostat 36 for altering the set point temperatures during various periods of the day, and various days of the week. The hand held remote control 40 is also preferably battery powered, and may be configured to transmit sensed temperature information upon sensing a minimum change in sensed temperature to reduce transmission frequency and prolong battery life.

The advantages of the above described embodiment and improvements should be readily apparent to one skilled in the art, as to enabling control of a variable capacity climate control system for a multi-zone space. Additional design considerations may be incorporated without departing from the spirit and scope of the invention. Accordingly, it is not intended that the invention be limited by the particular embodiment or form described above, but by the appended claims.

What is claimed is:

1. A climate control system having two or more stages of cooling operation for supplying conditioned air to a plurality of zones within a space to be conditioned, the system comprising:

a plurality of zone temperature sensors for periodically sensing temperature at preset intervals, and for transmitting sensed temperature information when the temperature of the zone has changed by more than a predetermined amount;

a plurality of controllable zone dampers for controlling the supply of conditioned air to each of the plurality of zones in the space;

a multi-speed circulating air blower for varying the flow rate of conditioned air to be supplied to the zones; and a thermostat capable of receiving transmitted temperature information from the plurality of zone temperature sensors, where the thermostat responsively initiates the operation of the circulating air blower and cooling system at less than full capacity when at least one zone temperature sensor transmits a sensed temperature that differs from the set point temperature by more than a specific amount, and the thermostat responsively initiates the opening of one or more controllable zone dampers corresponding to the at least one zone temperature sensor which transmitted a sensed temperature differing from the set point temperature by more than a specific amount to supply conditioned air to the at least one zone; and wherein the thermostat discontinues the use of temperature information from the at least one zone temperature sensor and displays a system error if the at least one zone temperature sensor does not transmit a significant change in sensed temperature for the at least one zone after a predetermined period of cooling system operation.

2. The climate control system of claim 1 wherein the thermostat switches the circulating air blower and cooling system to full capacity operation when either the cooling system has operated at less than full capacity for more than a predetermined time or when more than a predetermined number of zone temperature sensors transmit sensed temperatures that differ from the set point temperature by more than a specific amount.

3. The climate control system of claim 2 further comprising a heating system having two or more stages of operation, wherein the thermostat is adapted to initiate operation of the circulating air blower and the heating system at less than full capacity when at least one zone temperature sensor transmits a sensed temperature that differs from the set point temperature by more than a specific amount, and the thermostat responsively initiates the opening of one or more controllable zone dampers corresponding to the at least one zone temperature sensor which transmitted a sensed temperature differing from the set point temperature by more than a specific amount to supply conditioned air to the at least one zone.

4. The climate control system of claim 3 wherein the thermostat switches the circulating air blower and heating system to full capacity operation when either the heating system has operated at less than full capacity for more than a predetermined time or when more than a predetermined number of zone temperature sensors transmit sensed temperatures that differs from the set point temperature by more than a specific amount.

5. The climate control system of claim 4 wherein the thermostat switches a controllable zone damper to a closed position when the sensed temperature transmitted by the zone temperature sensor corresponding to the controllable zone damper is at the set point temperature or within a specific amount.

6. The climate control system of claim 5 wherein the plurality of zone temperature sensors are battery powered and are configured to periodically sense temperature at extended preset intervals to reduce transmission frequency and prolong battery life upon sensing a temperature change of less than a minimum amount that is indicative of conditioned air not being supplied to the zone.

7. The climate control system of claim 6 wherein the plurality of zone temperature sensors are configured to periodically sense temperature at shortened preset intervals upon sensing more than a preset temperature change that is indicative of conditioned air being supplied to the zone.

8. The climate control system of claim 1 wherein each of the plurality of zone temperature sensors further comprise user input means for offsetting the sensed temperature value by a user selected amount, to allow the user to adjust the temperature of the zone to the user's preference.

9. The climate control system of claim 8, wherein the controllable zone dampers and zone temperature sensors in communication with the thermostat communicate via wireless RF transmission.

10. The climate control system of claim 1 wherein each of the plurality of zone temperature sensors further comprise a user input means for selecting a temporary unoccupied mode in which the temperature sensor transmits an inactive status to the controller for a predetermined time period.

11. The climate control system of claim 1 wherein each of the plurality of zone temperature sensors further comprise a user input means for selecting an off mode in which the temperature sensor transmits an inactive status to the thermostat.

12. A climate control system having two or more heating and cooling stages of operation for supplying conditioned air to a plurality of zones within a space to be conditioned, the system comprising:

a plurality of battery powered zone temperature sensors for sensing temperature at preset intervals, the temperature sensor being configured to transmit temperature information only when the sensed temperature has changed by more than a predetermined amount so as to reduce transmissions and prolong battery life when conditioned air is not being supplied to the space;

a plurality of controllable zone dampers for controlling the supply of conditioned air to each of the plurality of zones in the space;

a multi-speed circulating air blower for varying the flow rate of conditioned air to be supplied to the zones;

a thermostat for receiving transmitted temperature information from the plurality of zone temperature sensors and controlling the operation of the two or more heating and cooling stages and plurality of zone dampers to supply conditioned air to the plurality of zones, the thermostat being adapted to initiate operation of the circulating air blower and heating or cooling system at less than full capacity when fewer than a predetermined number of zones have a sensed temperature that differ from the set point temperature by more than a predetermined amount, and to switch the circulating air blower and heating or cooling system from less than full capacity operation to full capacity operation after either a predetermined time period of less than full capacity operation has transpired or when more than a predetermined number of zones have a sensed temperature that differ from the set point temperature by more than a predetermined amount.

13. The climate control system of claim 12 wherein thermostat switches a controllable zone damper to an open position when the difference between the set point temperature and the sensed temperature transmitted by the zone temperature sensor corresponding to the controllable zone damper is more than a predetermined amount.

14. The climate control system of claim 13 wherein the thermostat switches a controllable zone damper to a closed position when the difference between the set point temperature and the sensed temperature transmitted by the zone temperature sensor corresponding to the controllable zone damper is less than a predetermined amount.

15. The climate control system of claim 14 wherein each of the plurality of zone temperature sensors further comprise user input means for offsetting the sensed temperature value by a user selected amount, to allow the user to adjust the temperature of the zone to the user's preference.

16. The climate control system of claim 15 wherein the zone temperature sensor adds the user selected offset value to the sensed temperature, for transmission to the thermostat.

17. The climate control system of claim 16 wherein each of the plurality of zone temperature sensors further comprise a user input means for selecting a temporary unoccupied mode in which the temperature sensor transmits an inactive status to the thermostat for a predetermined time period.

18. A climate control system having two or more heating and cooling stages of operation for supplying conditioned air to a plurality of zones within a space to be conditioned, the system comprising:

a plurality of battery powered zone temperature sensors for sensing the temperature in a zone at a preset frequency, the temperature sensor being configured to transmit temperature information only when the sensed temperature has changed by more than a predetermined amount so as to reduce transmissions and prolong battery life when conditioned air is not being supplied to the space;

a plurality of controllable zone dampers for controlling the supply of conditioned air to each of the plurality of zones in the space;

a multi-speed circulating air blower for varying the flow rate of conditioned air to be supplied to the zones;

a thermostat for receiving transmitted temperature information from the zone temperature sensors and controlling the operation of the two or more heating and cooling stages and plurality of zone dampers to supply conditioned air to the plurality of zones, wherein the thermostat initiates operation of the circulating air blower and heating or cooling system at less than full capacity when a single zone temperature sensor transmits a temperature value that differs from the set point temperature by more than a predetermined amount, and the thermostat switch the circulating air blower and heating or cooling system from less than full capacity operation to full capacity operation when more than two zone temperature sensors transmit temperature values that differ from the set point temperature by more than a predetermined amount.

19. The climate control system of claim 18 wherein thermostat switches a controllable zone damper to an open position when the difference between the set point temperature and the sensed temperature of the zone corresponding to the controllable zone damper is more than a predetermined amount, and the thermostat switches the controllable zone damper to a closed position when the difference between the set point temperature and the sensed temperature of the zone corresponding to the controllable zone damper is less than a predetermined amount.

20. The climate control system of claim 19 wherein each of the plurality of zone temperature sensors further comprise user input means for offsetting the sensed temperature value by a user selected amount, wherein the zone temperature sensor adds the user selected offset value to the sensed temperature for transmission to the thermostat for allowing the user to adjust the temperature of the zone to the user's preference.

21. The climate control system of claim 19 wherein the thermostat switches the circulating air blower and heating or cooling system from less than full capacity operation to full capacity operation after a predetermined time period of less than full capacity operation has transpired.

22. The climate control system of claim 19, further comprising a hand held remote control having user input means, wherein the hand held remote control is capable of transmitting signals to the thermostat to provide information as to which zone the hand-held remote control is presently in.

* * * * *